(12) United States Patent
Hisamatsu

(10) Patent No.: US 8,005,078 B2
(45) Date of Patent: Aug. 23, 2011

(54) PACKET PROCESSOR, PACKET CONTROL METHOD, AND PACKET CONTROL PROGRAM

(75) Inventor: Hidenori Hisamatsu, Tokyo (JP)

(73) Assignee: NEC Corporation, Tokyo (JP)

( * ) Notice: Subject to any disclaimer, the term of this patent is extended or adjusted under 35 U.S.C. 154(b) by 133 days.

(21) Appl. No.: 12/465,058

(22) Filed: May 13, 2009

(65) Prior Publication Data
US 2009/0285105 A1 Nov. 19, 2009

(30) Foreign Application Priority Data
May 19, 2008 (JP) .................. 2008-131001

(51) Int. Cl.
*H04Q 11/00* (2006.01)
(52) U.S. Cl. .................................... 370/360

(58) Field of Classification Search .......... 370/360–388, 370/412–413, 503–510
See application file for complete search history.

(56) References Cited

U.S. PATENT DOCUMENTS

| | | | | |
|---|---|---|---|---|
| 7,443,887 B2 * | 10/2008 | Ohkuma | ....................... | 370/503 |
| 7,529,202 B2 * | 5/2009 | Oshima | ....................... | 370/311 |
| 2008/0310415 A1* | 12/2008 | Hisamatsu | ................... | 370/392 |
| 2009/0268629 A1* | 10/2009 | Hisamatsu | ................... | 370/252 |
| 2009/0271647 A1* | 10/2009 | Hisamatsu | ................... | 713/323 |

FOREIGN PATENT DOCUMENTS

| | | |
|---|---|---|
| JP | 2002164924 A | 6/2002 |
| JP | 2004236350 A | 8/2004 |

* cited by examiner

*Primary Examiner* — Frank Duong (57) ABSTRACT

A packet processor having one or two or more packet processing units is provided with a packet detector which detects whether or not a packet exists in a packet processing unit, and outputs a packet detection signal indicating a result of the detection, and a clock frequency controller which controls a clock to be supplied to the packet processing unit based on the packet detection signal.

12 Claims, 4 Drawing Sheets

CLOCK FREQUENCY CONTROL LOGIC TABLE

| PACKET NON-DETECTION SIGNAL STRING (F, A, B, C) | CLOCK FREQUENCY CONTROL SIGNAL A | CLOCK FREQUENCY CONTROL SIGNAL B | CLOCK FREQUENCY CONTROL SIGNAL C |
|---|---|---|---|
| (1, 1, 1, 1) | SQUEEZE | SQUEEZE | SQUEEZE |
| (0, 1, 1, 1) | EXPAND | SQUEEZE | SQUEEZE |
| (1, 0, 1, 1) | EXPAND | EXPAND | SQUEEZE |
| (1, 1, 0, 1) | SQUEEZE | EXPAND | EXPAND |
| (1, 1, 1, 0) | SQUEEZE | SQUEEZE | EXPAND |
| (0, 0, 1, 1) | EXPAND | EXPAND | SQUEEZE |
| (0, 1, 0 1) | EXPAND | EXPAND | EXPAND |
| (0, 1, 1, 0) | EXPAND | SQUEEZE | EXPAND |
| (1, 1, 0, 0) | SQUEEZE | EXPAND | EXPAND |
| (1, 0, 1, 0) | EXPAND | EXPAND | EXPAND |
| (1, 0, 0, 1) | EXPAND | EXPAND | EXPAND |
| (1, 0, 0, 0) | EXPAND | EXPAND | EXPAND |
| (0, 1, 0, 0) | EXPAND | EXPAND | EXPAND |
| (0, 0, 1, 0) | EXPAND | EXPAND | EXPAND |
| (0, 0, 0, 1) | EXPAND | EXPAND | EXPAND |
| (0, 0, 0, 0) | EXPAND | EXPAND | EXPAND |

FIG. 3

CLOCK FREQUENCY CONTROL LOGIC TABLE

| PACKET NON-DETECTION SIGNAL STRING (F, A, B, C) | CLOCK FREQUENCY CONTROL SIGNAL A | CLOCK FREQUENCY CONTROL SIGNAL B | CLOCK FREQUENCY CONTROL SIGNAL C |
|---|---|---|---|
| (1, 1, 1, 1) | SQUEEZE | SQUEEZE | SQUEEZE |
| (0, 1, 1, 1) | SQUEEZE | SQUEEZE | SQUEEZE |
| (1, 0, 1, 1) | EXPAND | SQUEEZE | SQUEEZE |
| (1, 1, 0, 1) | SQUEEZE | EXPAND | SQUEEZE |
| (1, 1, 1, 0) | SQUEEZE | SQUEEZE | EXPAND |
| (0, 0, 1, 1) | EXPAND | SQUEEZE | SQUEEZE |
| (0, 1, 0 1) | SQUEEZE | EXPAND | SQUEEZE |
| (0, 1, 1, 0) | SQUEEZE | SQUEEZE | EXPAND |
| (1, 1, 0, 0) | SQUEEZE | EXPAND | EXPAND |
| (1, 0, 1, 0) | EXPAND | SQUEEZE | EXPAND |
| (1, 0, 0, 1) | EXPAND | EXPAND | SQUEEZE |
| (1, 0, 0, 0) | EXPAND | EXPAND | EXPAND |
| (0, 1, 0, 0) | SQUEEZE | EXPAND | EXPAND |
| (0, 0, 1, 0) | EXPAND | SQUEEZE | EXPAND |
| (0, 0, 0, 1) | EXPAND | EXPAND | SQUEEZE |
| (0, 0, 0, 0) | EXPAND | EXPAND | EXPAND |

PACKET PROCESSOR, PACKET CONTROL METHOD, AND PACKET CONTROL PROGRAM

This application is based upon and claims the benefit of priority from Japanese patent application No. 2008-131001, filed on May 19, 2008, the disclosure of which is incorporated herein in its entirety by reference.

BACKGROUND OF THE INVENTION

1. Field of the Invention

This invention relates to a packet processor for performing predetermined processing on an input packet and outputting the processed packet, a packet control method implemented by this packet processor, and a packet control program for implementing the packet control method. This invention in particular relates to a packet processor having one or two or more packet processing units and designed to supply a clock of a predetermined frequency to each of the packet processing units, a packet control method implemented by this packet processor, and a packet control program for implementing the packet control method.

2. Description of the Related Art

Various energy saving measures are being studied and developed at the global level for the purpose of global environment protection. In this trend, many countries have begun to discuss about enactment of legislation to mandate energy saving and reduction of carbon-dioxide emissions.

In general, many people will think that such energy saving measures apply to energy consumption arising from fields of transportation, logistics, and manufacture. On the other hand, also attracting attention is the increase in energy consumption by electronic equipment such as computers and servers, and information communication equipment and network infrastructure.

In the case of electronic equipment such as computers and servers, a relatively long period of time is spent without arithmetic processing, in other words, the equipment remains in the so-called stand-by state for a relatively long period of time. Therefore, reduction of the power consumption during the stand-by state effectively helps reducing the average power consumption, and hence reducing the carbon-dioxide emissions.

As for information communication equipment, however, such equipment is required to constantly stay in the data communicable state even though the communication system has been changed from analog to digital. Therefore, unlike the electronic equipment such as computers and servers, the stand-by state is prerequisitely not allowable for the information communication equipment.

It is believed, therefore, that the average power consumption of the information communication equipment cannot be reduced unless the stationary operating power is reduced.

As a result, the effort of power reduction is mainly pursued from the viewpoint of device technologies aiming at reduction of the operating voltage accompanied by the increased degree of integration and miniaturization of electronic components.

However, the operating voltage of such electronic components has already been reduced to below one volt. In an actual trend, the extent of reduction of operating voltage due to miniaturization of electronic components is now being decreased, and so is the effect obtained by increased degree of integration.

This has made it difficult to achieve significant reduction of power consumption, only by miniaturization or increased degree of integration of electronic components.

Advanced miniaturization of electronic components (for example, below 90 nm) has increased the leaked current up to a considerable level. For this reason, the power consumption during the stand-by state is being significantly increased in spite of research efforts made by device vendors using the device technologies.

On the other hand, various researches are being made also from the viewpoint of circuitry designs.

In this connection, efforts to reduce the power consumption are slowly but progressively pursued by employing an asynchronous circuit architecture and method using no clocks in place of a clock synchronization circuit architecture and method currently mainly used in designing internal circuit configuration of electronic components.

This technique aims to reduce the average power consumption by reducing the stationary operating power and the power consumption during the stand-by state. However, special development tools are required for design and verification in order to employ such asynchronous circuit architecture and method for common electronic components such as ASICs (Application Specific Integrated Circuits) and FPGAs (Field Programmable Gate Arrays). Such development tools have not yet been developed to such an extent as to be accessible for developers in general.

There are known several types of packet processors which perform a plurality of processing operations depending on content of a received packet and output the packet after completing all the processing operations. One of these packet processors is described, for example, in Japanese Laid-Open Patent Publication NO. 2002-164924.

These types of packet processors have a plurality of packet processing units. Each of these packet processing units is constantly supplied with a clock regardless of whether or not it has a packet to process. Therefore, considerably large power is, consumed when no packet is processed.

On the other hand, there are also known wireless communication devices designed to process a received signal by a plurality of processing units in sequence. This type of wireless communication device is described in Japanese Laid-Open Patent Publication NO. 2004-236350, for example.

In such a wireless communication device, a preceding processing unit monitors whether or not there exists data to be processed by a subsequent processing unit. The clock supply to the subsequent processing unit is controlled based on a monitoring result. In this manner, the wireless communication device is allowed to reduce the power consumption according to the amount of data to be processed.

However, this wireless communication device is only capable of dealing with received signals having a specific frame configuration, and is not capable of processing variable-length packets or responding to variation in processing time in the processing units. Consequently, the technology of this wireless communication device is not applicable directly to packet processors.

SUMMARY OF THE INVENTION

This invention has been made in view of the circumstances described above, and it is an object of the invention to provide a packet processor the input traffic capacity of which varies and which is capable of reducing the power consumption when receiving a low capacity traffic that is lower than the maximum capacity without impairing the throughput obtained when the input traffic capacity is at its maximum, a packet control method implemented by such a packet processor, and a packet control program for implementing the packet control method.

In order to achieve this object, an aspect of this invention provides a packet processor having one or two or more packet processing units, which is provided with a packet detector (or detecting means) for detecting whether or not a packet exists in the packet processing unit and outputting a packet detection signal indicating a result of the detection; and a clock frequency controller (or controlling means) for controlling a frequency of a clock supplied to the packet processing unit based on the packet detection signal.

Another aspect of this invention provides a packet control method for performing predetermined processing on an input packet and outputting the processed packet, and the method includes: detecting whether or not a packet exists in a packet processing unit for performing the predetermined processing; and performing a frequency squeezing control on a clock supplied to the packet processing unit when no packet exists in the packet processing unit.

Further, still another aspect of this invention provides a packet control program for causing a packet processor to perform predetermined processing on a packet input thereto and to output the processed packet, and the processing includes: detecting whether or not a packet exists in the packet processing unit for performing the predetermined processing; and performing a frequency squeezing control on a clock supplied to the packet processing unit when no packet exists in the packet processing unit.

DESCRIPTION OF THE EXEMPLARY EMBODIMENTS

In order to facilitate understanding of this invention, a configuration and operation of a packet processor according to a related art will first be described with reference to FIG. 1.

Figure 1:
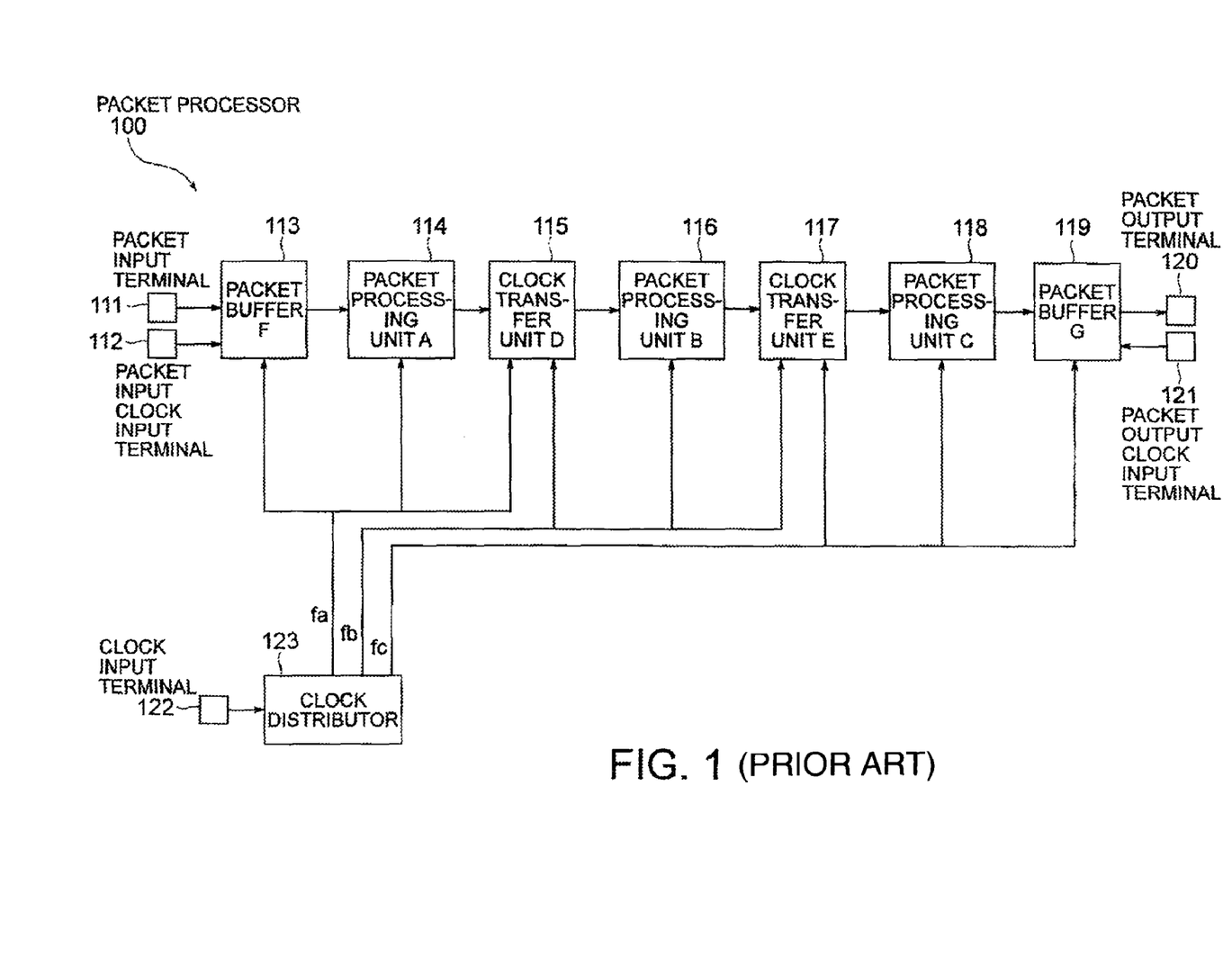
FIG. 1 is a block diagram showing a configuration of a packet processor according to a related art.

FIG. 1 is a functional block diagram illustrating packet processing by a packet processor 100 the input traffic capacity of which varies.

A packet input terminal 111 receives supply of an input packet. A packet input clock input terminal 112 receives supply of a clock (signal). A packet buffer F 113 takes in and accumulates the packet supplied to the packet input terminal 111 in synchronization with the clock supplied to the packet input clock input terminal 112.

The packet buffer F 113 transfers the accumulated packet to a packet processing unit A 114. Once the packet is transferred from the packet buffer F 113 to the packet processing unit A 114, the packet processing unit A 114 performs first packet processing A on the packet.

The packet processing unit A 114 transfers the packet having undergone the processing A to a packet processing unit B 116. The packet processing unit B 116 performs second packet processing B on the packet.

The packet processing unit B 116 transfers the packet having undergone the processing B to a packet processing unit C 118. The packet processing unit C 118 performs third packet processing C on the packet.

The packet processing unit C 118 transfers the packet having undergone the processing C to a packet buffer G 119. The packet buffer G 119 once accumulates the packet received from the packet processing unit C 118, and outputs the packet from a packet output terminal 120 in synchronization with a clock supplied to a packet output clock input terminal 121.

A clock distributor 123 generates clocks of optimal frequencies for the respective component blocks (frequencies fa, fb and fc, in this example) in response to a clock supplied to a clock input terminal 122, and supplies the generated clocks to the component blocks.

According to this configuration, an input packet is output after having undergone a plurality of processing operations.

If the width of the packet input interval is increased and the input traffic capacity is reduced, there occurs a state in which no packet is present in the packet processing unit A, the packet processing unit B, and the packet processing unit C. Thus, in the packet processor of the FIG. 1, clocks are supplied from the clock distributor 123 to the respective component blocks even when no packet processing operation is required.

Therefore, power consumption constantly occurs in a clock transferring driver, clock wiring capacity, clock operating flip-flops, and clock-dependent units in the clock-synchronous memory. In other words, so-called stand-by power consumption occurs in this packet processor. As a result, the average operating power consumption during low traffic operation is not reduced significantly in comparison with that during high traffic operation.

Preferred exemplary embodiments of a packet processor, a packet control method, and a packet control program according to this invention will be described with reference to the accompanying drawings.

The packet processor and the packet control method according to the exemplary embodiments described below can be realized by a computer implementing the packet control program of the invention. The packet control program is provided, for example, by means of a recording medium. The recording medium may be, for example, a magnetic disk, an optical disk, a semiconductor memory, or any other computer-readable recording medium.

The packet control program recorded on a recording medium can be installed into the computer either by directly loading the recording medium into the computer, or via a communication line.

Packet Processor

First, a packet processor according to an embodiment of this invention will be described with reference to FIG. 2.

Figure 2:
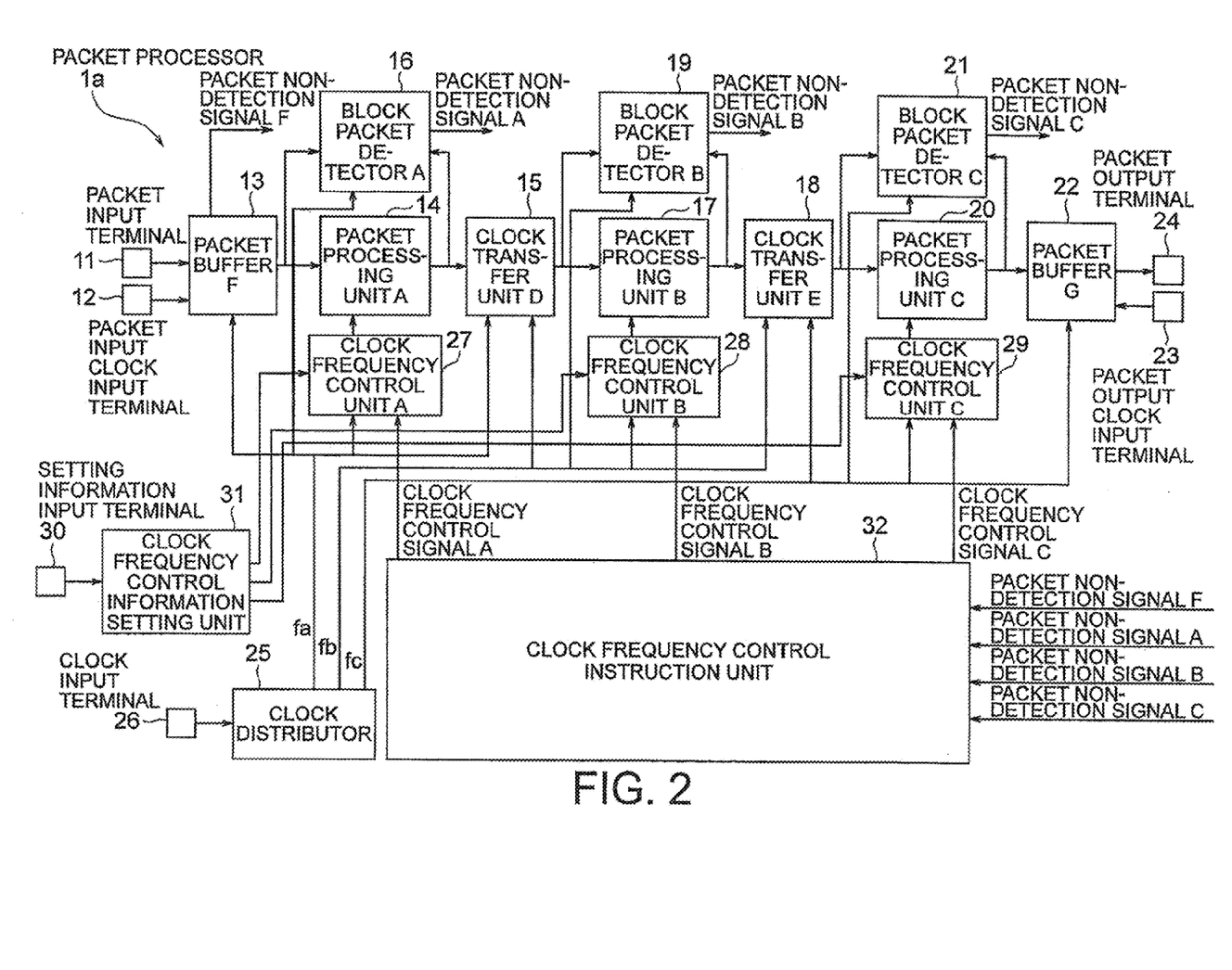
FIG. 2 is a block diagram showing a configuration of a packet processor according to an embodiment of this invention.

FIG. 2 is a block diagram showing a configuration of a packet processor 1*a* according to this embodiment. This packet processor 1*a* is a packet processor capable of dealing with variation in input traffic capacity.

As shown in FIG. 2, the packet processor 1*a* has a packet input terminal 11, a packet input clock input terminal 12, a packet buffer F 13, a packet processing unit A 14, a clock transfer unit D 15, block packet detector (detecting means) A 16, a packet processing unit B 17, clock transfer unit E 18, block packet detector (detecting means) B 19, a packet processing unit C 20, block packet detector (detecting means) C 21, a packet buffer G 22, a packet output clock input terminal 23, a packet output terminal 24, a clock distributor 25, a clock input terminal 26, a clock frequency control unit A 27, a clock frequency control unit B 28, a clock frequency control unit C 29, a setting information input terminal 30, a clock frequency control information setting unit 31, a clock frequency control instruction unit 32.

The packet input terminal 11 receives supply of an input packet. The packet input clock input terminal 12 receives supply of a clock. The packet buffer F 13 takes in the packet supplied to the packet input terminal 11 in synchronization with the clock supplied to the packet input clock input terminal 12.

The packet buffer F (input-side packet buffer) 13 accumulates the packet input through the packet input terminal 11. The packet buffer F 13 transfers the accumulated packet to the packet processing unit A 14.

The packet buffer F 13 transmits a packet non-detection signal F to the clock frequency control instruction unit 32. The packet non-detection signal F indicates logic "1" when no packet is accumulated in the packet buffer F 13, whereas indicates logic "0" when a packet is accumulated therein.

The packet processing unit A 14 performs first packet processing A on the packet. The packet processing unit A 14 then transfers the packet having undergone the processing A to the packet processing unit B 17 via the clock transfer unit D 15.

The block packet detector A 16 monitors packets input to and output from the packet processing unit A 14, and sends a packet non-detection signal A to the clock frequency control instruction unit 32. The packet non-detection signal A indicates logic "1" when no packet exists in the packet processing unit A 14, whereas indicates logic "0" when a packet exists therein.

The packet processing unit B 17 performs second packet processing B on the packet received via the clock transfer unit D 15. The packet processing unit B 17 then transfers the packet having undergone the processing B to the packet processing unit C 20 via the clock transfer unit E 18.

The block packet detector B 19 monitors packets input to and output from the packet processing unit B 1, and sends a packet non-detection signal B to the clock frequency control instruction unit 32. The packet non-detection signal B indicates logic "1" when no packet exists in the packet processing unit B 17, whereas indicates logic "0" when a packet exists therein.

The packet processing unit C 20 performs third packet processing C on the packet received via the clock transfer unit E 18. The packet processing unit C 20 then transfers the packet having undergone the processing C to the packet buffer G 22.

The block packet detector C 21 monitors packets input to and output from the packet processing unit C 20, and sends a packet non-detection signal C to the clock frequency control instruction unit 32. The packet non-detection signal C indicates logic "1" when no packet exists in the packet processing unit C 20, whereas indicates logic "0" when a packet exists therein.

The packet buffer G (output-side packet buffer) 22 outputs the packet from the packet output terminal 24 in synchronization with a clock supplied to the packet output clock input terminal 23.

The block packet detector A 16, the block packet detector B 19, and the block packet detector C 21 monitor the numbers of packets input to and output from the packet processing unit A 14, the packet processing unit B 17, and the packet processing unit C 20, respectively. When the difference between the numbers of the input and output packets is zero, the relevant block packet detector A, B, or C determines that there is no packet accumulated in the corresponding packet processing unit A, B, or C. This function can be performed by an add-subtract counter which adds one each time a packet is input and subtracts one each time a packet is output.

The clock transfer unit D 15 and the clock transfer unit E 18 are well-known to those skilled in the art, and are not directly related to this invention. Therefore, detailed description of these clock transfer units will be omitted. A technology relating to a clock transfer unit is disclosed, for example, in Japanese Laid-Open Patent Publication No. H06-69913.

The clock distributor 25 generates clocks (or clock signals) of optimal frequencies for the respective component blocks based on a clock supplied from a clock input terminal 122, and distributes the generated clocks to the component blocks.

In order to simplify the description, it is assumed here that the clocks to be distributed have three different frequencies fa, fb, and fc. However, clocks having different frequencies may be distributed to different component blocks, respectively. Alternatively, clocks having the same frequency may be distributed in common to two or more component blocks.

Based on a clock frequency control signal A received from the clock frequency control instruction unit 32, the clock frequency control unit A 27 sends the clock distributed by the clock distributor 25 to the packet processing unit A 14 after (or without) squeezing the clock frequency fa (reducing the frequency with the minimum value set to zero).

Based on a clock frequency control signal B received from the clock frequency control instruction unit 32, the clock frequency control unit B 28 sends the clock distributed by the clock distributor 25 to the packet processing unit B 17 after (or without) squeezing the clock frequency fb (reducing the frequency with the minimum value set to zero).

Based on a clock frequency control signal C received from the clock frequency control instruction unit 32, the clock frequency control unit C 29 sends the clock distributed by the clock distributor 25 to the packet processing unit C 20 after (or without) squeezing the clock frequency fc (reducing the frequency with the minimum value set to zero).

The clock frequency control units 27, 28, and 29 are thus designed such that they can squeeze (reduce) the frequencies of the clock distributed to the packet processing units 14, 17, and 20.

The setting information input terminal 30 receives information relating to the frequency squeezing, for example, information on squeezed frequencies or squeezing ratio of one n-th of the original clock frequencies fa, fb, and fc.

The clock frequency control information setting unit 31 sends the information input to the setting information input terminal 30 to the clock frequency control unit A 27, the clock frequency control unit B 28, and the clock frequency control unit C 29.

Based on the information sent from the clock frequency control information setting unit 31, the clock frequency control unit A 27, the clock frequency control unit B 28, and the clock frequency control unit C 29 each determine a squeeze frequency when instructed to squeeze by the clock frequency control signals A, B, and C.

The clock frequency to squeeze is set for example to one n-th instead of being set to zero. This is an example of measures for avoiding the risk of a failure that may occur in the circuit operation of the component block receiving the supply of a clock the frequency of which is reduced to zero.

In addition, this example of setting the squeezing ratio to one n-th has an effect to prevent the increase of power consumption by reducing the scale of the circuit for squeezing the frequency in each of the clock frequency control units.

Further, the frequency squeezing may be repeated at predetermined intervals while stepwise increasing the value of n, like one half, one fourth, and one eighth.

The clock frequency control information setting unit 31 may be set by a program having processor functions not shown in FIG. 2.

Figure 3:
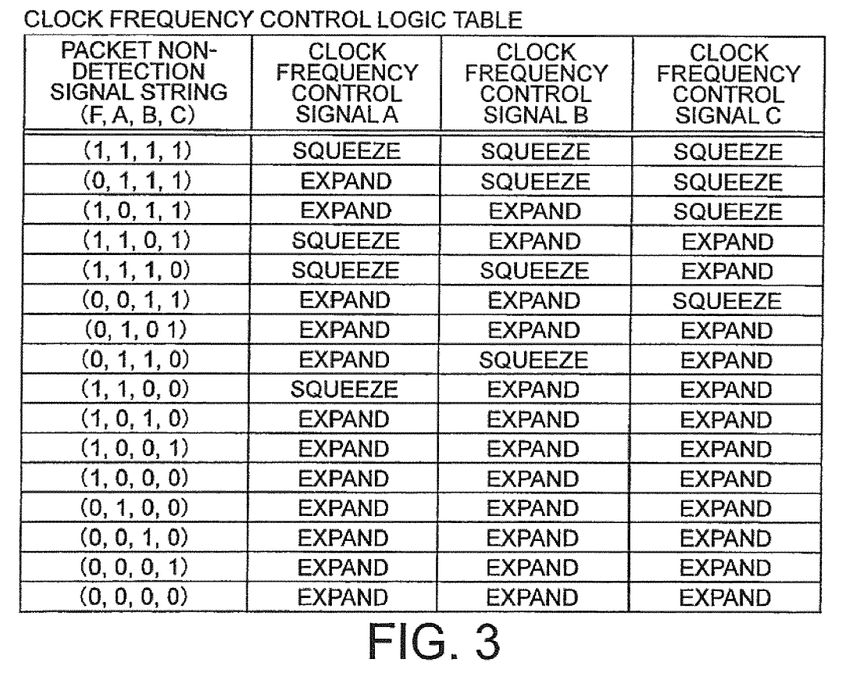
FIG. 3 is a table showing an example of a clock frequency control logic table used in the packet processor of FIG. 2.

The clock frequency control instruction unit 32 receives a packet non-detection signal F from the packet buffer F 13, a packet non-detection signal A from the block packet detector A 16, a packet non-detection signal B from the block packet detector B 19, and a packet non-detection signal C from the block packet detector C 21, and generates a clock frequency control signal A, a clock frequency control signal B, and a clock frequency control signal C with reference to a clock frequency control logic table shown in FIG. 3. The clock frequency control instruction unit 32 then sends the clock frequency control signals A, B, and C thus generated to the clock frequency control unit A 27, the clock frequency control unit B 28, and the clock frequency control unit C 29, respectively.

By sending the clock frequency control signals A, B, and C, the packet processing unit A 14, the packet processing unit B 17, and the packet processing unit C 20 are instructed whether or not the frequencies fa, fb, and fc of the clocks distributed thereto are to be squeezed.

The clock frequency control logic table will be described in detail later in the section "Clock Frequency Control Logic Table".

In this embodiment, the clock frequency control unit A 27, the clock frequency control unit B 28, the clock frequency control unit C 29, and the clock frequency control instruction unit 32 are collectively referred to as the "clock frequency controller (clock frequency squeezing controller)". They are also referred to as the clock frequency controlling means.

The packet processor according to this embodiment, as described above, is capable of reducing the operating power consumption of the packet processing units by squeezing the clock frequency (reducing the clock frequency with the minimal value set to zero) supplied to a packet processing unit when there exists no packet in that packet processing unit (and in the preceding packet processing unit). This provides an effect of reduction of the average power consumption.

Even in a case in which normal circuit operation cannot be expected if the clock frequency of a packet processing unit becomes zero, this embodiment provides an effect of reducing the average power consumption by reducing the clock frequency although the reduction is not so marked as when the clock frequency is made zero.

Packet Control Method

Operation (packet control method) of the packet processor 1a according to this embodiment will be described with reference to FIG. 2 again.

The packet buffer F 13 receives a packet from the packet input terminal 11 in synchronization with a clock input to the packet input clock input terminal 12, and accumulates the received packet.

The packet buffer F 13 sends to the clock frequency control instruction unit 32 a packet non-detection signal F indicating logic "1" when no packet is accumulated in the packet buffer F 13. In contrast, the packet buffer F 13 sends to the clock frequency control instruction unit 32 a packet non-detection signal F indicating logic "0" when a packet is accumulated therein.

The packet buffer F 13 transfers a packet to the packet processing unit A 14. The packet processing unit A 14 performs first packet processing A on the packet.

The block packet detector A 16 monitors packets input to and output from the packet processing unit A 14, and sends a packet non-detection signal A indicating logic "1" to the clock frequency control instruction unit 32 when no packet exists in the packet processing unit A 14. In contrast, when a packet exists in the packet processing unit A 14, the block packet detector A 16 sends a packet non-detection signal A indicating logic "0" to the clock frequency control instruction unit 32.

The packet processing unit A 14 transfers the packet having undergone the processing A to the packet processing unit B 17 via the clock transfer unit D 15. The packet processing unit B 17 performs second packet processing B on the packet.

The block packet detector B 19 monitors packets input to and output from the packet processing unit B 17, and sends a packet non-detection signal B indicating logic "1" to the clock frequency control instruction unit 32 when no packet exists in the packet processing unit B 17. In contrast, when a packet exists in the packet processing unit B 17, the block packet detector B 19 sends a packet non-detection signal B indicating logic "0" to the clock frequency control instruction unit 32.

The packet processing unit B 17 transfers the packet having undergone the processing B to the packet processing unit C 20 via the clock transfer unit E 18. The packet processing unit C 20 performs third packet processing C on this packet.

The block packet detector C 21 monitors packets input to and output from the packet processing unit C 20, and sends a packet non-detection signal C indicating logic "1" to the clock frequency control instruction unit 32 when no packets exists in the packet processing unit C 20. In contrast, when a packet exists in the packet processing unit C 20, the block packet detector C 21 sends a packet non-detection signal C indicating logic "0" to the clock frequency control instruction unit 32.

The packet processing unit C 20 transfers the packet having undergone the processing C to the packet buffer G 22. The packet buffer G 22 outputs the packet from the packet output terminal 24 in synchronization with a clock supplied to the packet output clock input terminal 23.

The clock distributor 25 generates clocks having optimal frequencies for operation of the respective component blocks based on the clock received from a clock input terminal 26, and distributes these clocks to the respective component blocks.

In order to simplify the description, it is assumed here that the clocks to be distributed/supplied are of three different frequencies fa, fb, and fc. However, a clock of an appropriate frequency may be supplied to each of the component blocks.

The clock frequency control information setting unit 31 distributes the information (information relating to the squeeze frequencies or the squeezing ratio of one n-th of original clocks fa, fb, and fc) input to the setting information input terminal 30, to the clock frequency control unit A 27, the clock frequency control unit B 28, and the clock frequency control unit C 29.

The clock frequency control unit A 27, the clock frequency control unit B 28, and the clock frequency control unit C 29 each determine a squeeze frequency based on the information distributed from the clock frequency control information setting unit 31, when instructed to squeeze the frequency by the clock frequency control signals A, B, and C (to reduce the frequency with the minimum value set to zero).

Upon receiving the packet non-detection signal F from the packet buffer F 13, the packet non-detection signal A from the block packet detector A 16, the packet non-detection signal B from the block packet detector B 19, and the packet non-detection signal C from the block packet detector C 21, the clock frequency control instruction unit 32 generates a clock frequency control signal A, a clock frequency control signal B, and a clock frequency control signal C with reference to a clock frequency control logic table shown in FIG. 3.

The clock frequency control instruction unit 32 then sends the clock frequency control signal A, clock frequency control signal B, and clock frequency control signal C thus generated to the clock frequency control unit A 27, the clock frequency control unit B 28, and the clock frequency control unit C 29, respectively. The clock frequency control units are thereby instructed whether or not the clock frequencies fa, fb, and fc to be distributed to the packet processing unit A 14, the packet processing unit B 17, and the packet processing unit C 20 are to be squeezed.

In the packet processing method according to this embodiment of the invention as described above, when there exists no packet in a packet processing unit and in its preceding packet processing unit, the clock frequency to be distributed to the relevant packet processing unit is squeezed (reduced with the minimum value set to zero), so that the operating power consumption of the packet processing units can be reduced. This provides an effect of reducing the average power consumption.

Clock Frequency Control Logic Table

Description will be made on a clock frequency control logic table.

As shown in FIG. 3, a clock frequency control logic table is a table in which the items of packet non-detection signal string (F, A, B, C), clock frequency control signal A, lock control signal B, and clock frequency control signal C are associated with each other.

The item of packet non-detection signal string (F, A, B, C) indicates a combination of the logic values of the packet non-detection signal F output by the packet buffer F 13, the packet non-detection signal A output by the block packet detector A 16, the packet non-detection signal B output by the block packet detector B 19, and the packet non-detection signal C output by the block packet detector C 21.

The values of the clock frequency control signal A, the clock frequency control signal B, and the clock frequency control signal C are determined by signal strings each consisting of the values of the packet non-detection signal F, the packet non-detection signal A, the packet non-detection signal B, and the packet non-detection signal C.

Specifically, the value of the clock frequency control signal A is determined by a logical sum of the packet non-detection signal A indicating whether or not a packet exists in the packet processing unit A 14, and the packet non-detection signal F indicating whether or not a packet exists in the packet buffer F 13 preceding the packet processing unit A 14.

Likewise, the value of the clock frequency control signal B is determined by a logical sum of the packet non-detection signal B indicating whether or not a packet exists in the packet processing unit B 17, and the packet non-detection signal A indicating whether or not a packet exists in the packet processing unit A 14 preceding the packet processing unit B 17. The value of the clock frequency control signal C is determined by a logical sum of the packet non-detection signal C indicating whether or not a packet exists in the packet processing unit C 20, and the packet non-detection signal B indicating whether or not a packet exists in the packet processing unit B 17 preceding the packet processing unit C 20.

More specifically, the clock frequency control signal A is determined to be "SQUEEZE" when both the packet non-detection signal F and the packet detection signal A are logic "1", whereas otherwise is determined to be "EXPAND".

The clock frequency control signal B is determined to be "SQUEEZE" when both the packet non-detection signal A and the packet non-detection signal B are logic "1", whereas otherwise is determined to be "EXPAND".

The clock frequency control signal C is determined to be "SQUEEZE" when both the packet non-detection signal B and the packet non-detection signal C are logic "1", whereas otherwise is determined to be "EXPAND".

The clock frequency control signals can thus be determined to be "SQUEEZE", because the clock supply is not required to a packet processing unit in which the packet processing is not performed.

It is made a condition that no packet exists either in a packet processing unit or in its preceding packet processing unit (or in the preceding packet buffer), for the purpose of ensuring sufficient time in consideration of the total time required for detecting the packet non-detection signals, calculating by the clock frequency control instruction unit 32, and switching the clock frequency control units.

Therefore, if it is clear that the traffic transfer time of a packet flowing from the packet input terminal 11 to the packet output terminal 24 is sufficiently longer than the total time required for detecting the packet non-detection signals, calculating by the clock frequency control instruction unit 32, an switching the clock frequency control units, it is not necessary to ensure sufficient time allowance. In such a case, a clock frequency control logic table as shown in FIG. 4 may be used in place of the clock frequency control logic table shown in FIG. 3.

Figure 4:
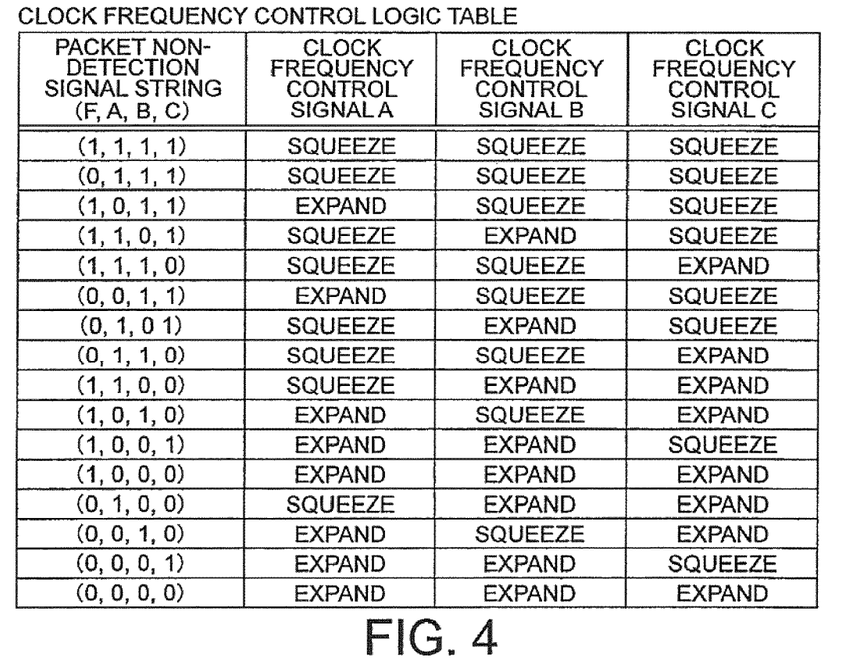
FIG. 4 is a table showing another example of a clock frequency control logic table used in the packet processor of FIG. 2.

In the clock frequency control logic table shown in FIG. 4, the values of the clock frequency control signal A, the clock frequency control signal B, and the clock frequency control signal C are determined by signal strings each consisting of the logic values of the packet non-detection signal F, the packet non-detection signal A, the packet non-detection signal B, and the packet non-detection signal C.

Specifically, the clock frequency control signal A is dependent on the packet non-detection signal A indicating whether or not a packet exists in the packet processing unit A 14. The clock frequency control signal B is depending on the packet non-detection signal B indicating whether or not a packet exists in the packet processing unit B 17, and the clock frequency control signal C is dependent on the packet non-detection signal C indicating whether or not a packet exists in the packet processing unit C 20.

More specifically, the clock frequency control signal A is determined to be "SQUEEZE" when the value of the packet non-detection signal A is logic "1", whereas it is determined to be "EXPAND" when the value of the packet non-detection signal A is logic "0".

The clock frequency control signal B is determined to be "SQUEEZE" when the value of the packet non-detection signal B is logic "1", whereas it is determined to be "EXPAND" when the value of the packet non-detection signal B is logic "0".

The clock frequency control signal C is determined be "SQUEEZE" when the value of the packet non-detection signal C is logic "1", whereas is determined to be "EXPAND" when the value of the packet non-detection signal C is logic "0".

If sufficient time cannot be ensured in consideration of the total time required for detecting the packet non-detection signals, calculating by the clock frequency control instruction unit 32, and switching the clock frequency control units even if it is made a condition that no packet exists either in a relevant packet processing unit or in the packet processing unit precedent thereto, the clock frequency control signals may be expanded successively on the condition that a packet exists in none of a relevant packet processing unit, the packet processing unit precedent thereto, and the packet processing unit preceding the precedent packet processing unit.

Thus, according to the packet processor, the packet control method, and the packet control program according to the embodiment as described above, the circuit power consumption in a packet processor of information communication equipment, whose input traffic capacity varies, can be reduced when a lower traffic than the maximum capacity is input, without impairing the throughput that can be obtained when the input traffic capacity is at its maximum. This makes it possible to reduce the average power consumption of the electronic components (e.g. FPGAs and ASICs) to a lower level than that of the related packet processors, without the need of using any special development tools as in the case employing an asynchronous circuit configuration or system.

Although the description has been made of the packet processor, the packet control method, and the packet control program of this invention in terms of the preferred embodiment thereof, the packet processor, the packet control method, and the packet control program of this invention are not limited to the embodiment described above, but may be otherwise variously embodied within the scope of this invention.

For example, although in the embodiment described above, the clock frequency control unit A, the clock frequency control unit B, and the clock frequency control unit C are provided as the clock frequency control units, but the invention is not limited to this, and a clock frequency control unit G for example may further be provided for controlling the frequency of the clock input to the packet buffer G.

Figure 5:
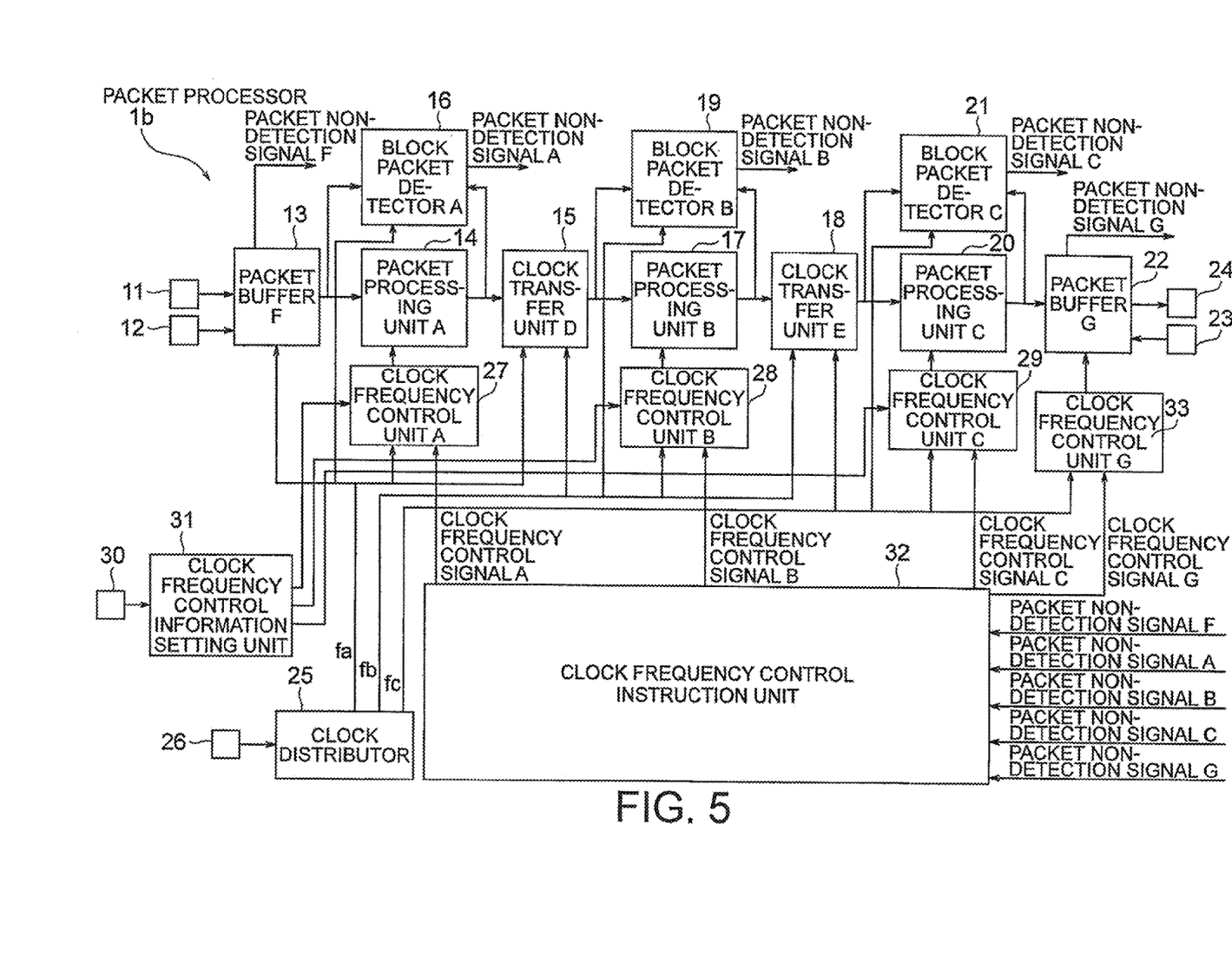
FIG. 5 is a block diagram showing a configuration of a packet processor according to another embodiment of this invention.

A circuit configuration of a packet processor having this clock frequency control unit G is shown in FIG. 5.

The packet processor 1b shown in FIG. 5 is different from the packet processor 1a shown in FIG. 2 in that the packet buffer G 22 outputs a packet non-detection signal G indicating that no packet is accumulated in the packet buffer G 22. Upon receiving the packet non-detection signal G, the clock frequency control instruction unit 32 calculates a clock frequency control signal G based on the same clock frequency control logic as shown in FIG. 3 or FIG. 4, and sends the obtained clock frequency control signal G to the clock frequency control unit G 33 for controlling the frequency of the packet input-side clock fc of the packet buffer G 22.

The clock frequency control unit G 33 controls the frequency of the clock supplied to the packet processing unit G 22 based on the clock frequency control signal G.

According to this configuration, when no packet is accumulated in the packet processing unit G 22, or when a packet is accumulated neither in the packet processing unit C 20 nor in the packet buffer G 22, the frequency of the clock supplied to the packet processing unit G 22 can be squeezed. This enables the packet processor 1b to reduce the power consumption further more than the packet processor 1a shown in FIG. 2.

Although the packet processors 1a and 1b shown in FIG. 2 and FIG. 5 are each configured to have three packet processing units A, B, and C and two clock transfer units D and E, the number of the packet processing units is not limited to three and the number of the clock transfer units is not limited to two. The numbers of the packet processing units and clock transfer units may be any other numbers. For example, when the number of the packet processing units is N, the number of the clock transfer units is (N−1). When the minimum configuration of N=1 is employed, the number of the packet processing unit is one and no clock transfer unit is provided.

This invention relates to control of frequencies of clock signals supplied to one or two or more packet processing units. Therefore, this invention is applicable to devices and equipment having one or two or more packet processing units.

What is claimed is:

1. A packet processor comprising:
   a packet processing unit;
   a packet detector for detecting whether or not a packet exists in the packet processing unit and outputting a packet detection signal indicating a result of the detection; and
   a clock frequency controller for controlling a frequency of a clock supplied to the packet processing unit based on the packet detection signal.

2. The packet processor as claimed in claim 1, wherein the packet detector monitors packets input to and output from the packet processing unit to detect whether or not a packet exists in the packet processing unit.

3. The packet processor as claimed in claim 1, comprising an input-side packet buffer which accumulates a packet input externally and outputs a packet detection signal indicating whether or not a packet is accumulated therein.

4. The packet processor as claimed in claim 1, comprising an output-side packet buffer which accumulates a packet having undergone predetermined processing in the packet processing unit, and outputs a packet detection signal indicating whether or not a packet is accumulated therein.

5. The packet processor as claimed in claim 1, wherein the clock frequency controller comprises:
   a clock frequency control instruction unit which receives the packet detection signal, generates a clock frequency control signal based on the received packet detection signal, and outputs the generated clock frequency control signal; and
   a clock frequency control unit for controlling a frequency of a clock supplied to the packet processing unit based on the clock frequency control signal.

6. The packet processor as claimed in claim 5, wherein when no packet exists in the packet processing unit, the clock frequency control instruction unit generates a clock frequency control signal indicating that the frequency of the clock supplied to the packet processing unit is to be controlled and outputs the generated clock frequency control signal.

7. The packet processor as claimed in claim 5, wherein when a packet exists neither in the packet processing unit nor in a processing unit preceding the packet processing unit, the clock frequency control instruction unit generates a clock frequency control signal indicating that the frequency of the clock supplied to the packet processing unit is to be controlled and outputs the generated clock frequency control signal.

8. The packet processor as claimed in claim 5, further comprising:
   a setting information input unit for receiving information relating to clock frequency control; and
   a clock frequency control information setting unit for sending the received information to the clock frequency control unit.

9. A packet control method for performing predetermined processing on an input packet and outputting the processed packet, the method comprising:
   detecting whether or not a packet exists in a packet processing unit for performing the predetermined processing; and performing a frequency squeezing control on a clock supplied to the packet processing unit when no packet exists in the packet processing unit.

10. The packet control method as claimed in claim 9, further comprising:
   detecting whether or not a packet exists in a packet processing unit preceding the relevant processing unit; and
   performing a frequency squeezing control on a clock supplied to the relevant packet processing unit when a packet exists both neither in the relevant packet processing unit nor in the processing unit preceding the relevant packet processing unit.

11. A computer readable non-transitory medium embodied thereon a packet control program for causing a packet processor to perform predetermined processing on a packet input thereto and to output the processed packet, wherein the predetermined processing comprises:
   detecting whether or not a packet exists in the packet processing unit for performing the predetermined processing; and
   performing a frequency squeezing control on a clock supplied to the packet processing unit when no packet exists in the packet processing unit.

12. The computer readable non-transitory medium as claimed in claim 11, wherein the packet control program causes a packet processor to perform processing comprising:
   detecting whether or not a packet exists in a packet processing unit preceding the relevant processing unit; and
   performing a frequency squeezing control on a clock supplied to the relevant packet processing unit when a packet exists neither in the relevant packet processing unit nor in the packet processing unit preceding the relevant processing unit.

* * * * *